United States Patent Office 2,914,167
Patented Nov. 24, 1959

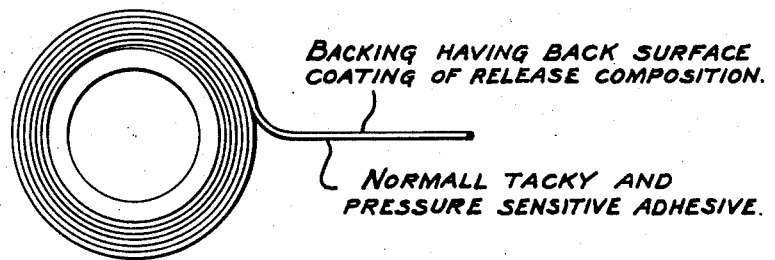
Fig. 1 — Backing having back surface coating of release composition. Normall tacky and pressure sensitive adhesive.
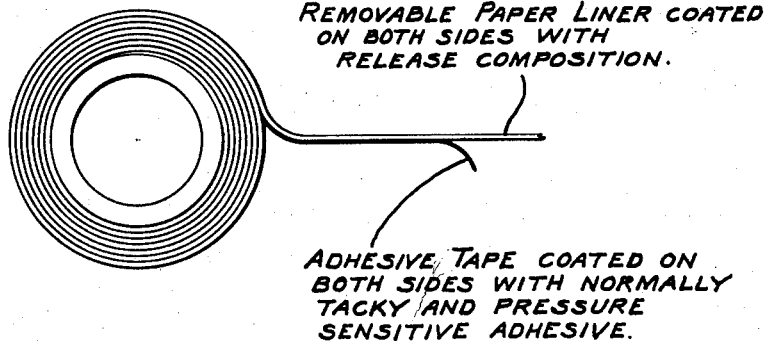
Fig. 2 — Removable paper liner coated on both sides with release composition. Adhesive tape coated on both sides with normally tacky and pressure sensitive adhesive.

2,914,167

PRESSURE SENSITIVE ADHESIVE TAPE AND METHOD OF MANUFACTURE

Albert Holtz, Highland Park, N.J., assignor, by mesne assignments, to Johnson & Johnson, New Brunswick, N.J., a corporation of New Jersey Application March 26, 1956, Serial No. 573,880

12 Claims. (Cl. 206—59)

This invention relates to normally tacky and pressure-sensitive sheets or tapes, and in particular to an improved normally tacky and pressure-sensitive sheet or tape provided with a novel low adhesion backsize coating or release agent on the back surface of said sheet or tape.

Normally tacky and pressure-sensitive tapes are usually prepared and sold in rolls and are put to their ultimate use directly from the roll. Whenever a normally tacky and pressure-sensitive tape is applied to a high affinity backing and the resulting tape is rolled or stacked up, "freezing" occurs between the adhesive united to the backing of one layer of tape and the backing of the adjacent layer of tape, in the absence of some means to prevent it. When "freezing" occurs, unwinding of the tape or the removal of one layer from another in general and subsequent successful use is impossible. Whenever unwinding of a roll of tape becomes difficult, there occurs an offsetting of the adhesive resulting in a loss of tack of the adhesive.

Accordingly, where there is a high affinity between the backing and the normally tacky and pressure-sensitive adhesive, it has been the practice to provide the back face of the backing with a release agent, and/or backsize coating to prevent "freezing." Unfortunately, many of the prior backsize or release compositions—although effective in preventing "freezing" to provide easy unwind—are not entirely satisfactory, because of their extreme tendency to detract from the adhesiveness or tackiness of pressure-sensitive adhesives brought into contact therewith. Moreover, many of the heretofore used normally tacky and pressure-sensitive tapes employing release or backsize coatings—while initially satisfactory with respect to easy unwind and tackiness—on aging (1) develop high adhesion to backing resulting in "freezing" whereby the tape can not be unwound if rolled or separated if stacked without causing delamination of the backing, and/or (2) deteriorate, resulting in detackification of the adhesive.

Accordingly, it is an object of this invention to provide normally tacky and pressure-sensitive adhesive sheets or tapes having easy unwind characteristics yet retaining their good tack or adhesiveness. A further object of this invention is to provide improved normally tacky and pressure-sensitive adhesive sheets or tapes which retain easy unwind characteristics and good adhesiveness on aging. A still further object of this invention is to provide a novel method for the production of improved normally tacky and pressure-sensitive tapes which permit easy unwinding thereof when in the form of rolls with very little effort, yet resisting any offsetting to the surface of the normally tacky and pressure-sensitive adhesive which would result in a loss of tack of the adhesive. A still further object of this invention is to provide novel improved interliners to be wound in a roll between layers of tape which have been coated with pressure-sensitive adhesive on both sides, preventing adherence or fusing together of layers and allowing easy unwinding. Yet a further object of this invention is to provide novel improved protective sheets to be applied to the tacky surface of pressure-sensitive labels or any article which has a tacky surface, to protect the tacky surface until ready for use, at which time the protective sheet may be easily and quickly removed, leaving the surface with its original aggressively tacky properties unimpaired.

It has been found that the foregoing objects of this invention can be realized by the utilization of a novel backsize composition. In general, this novel backsize composition comprises a film former agent to act as a carrier for a release agent, and a release agent comprising a high melting waxy material having a melting point above about 200° F. A plasticizer may or may not be present depending upon the particular characteristics desired. It has been found that when the afore-mentioned backsize is applied to a substrate or back face of a backing in the form of a coat, the formed coat imparts to the coated surface good release characteristics without causing harmful detackification. Moreover, it has been found that these desirable characteristics are retained on aging.

More particularly, the film former agent to be used in accordance with this invention is characterized by toughness and flexibility and should have good adhesion to the particular substrate to which the novel backsize composition is to be applied. Moreover, it should form a continuous film at low coating weight of the order of 0.1 to 2.5 oz. per sq. yd. depending upon surface roughness and porosity. Thus, any of the known film-former agents recognized in the art as having the aforementioned characteristics may be used. Hence, the film-former agent may be any of several tough flexible materials recognized in the art as suitable for surface sizing of tape backings. Whether or not a plasticizer is used in conjunction with the film-former agent depends upon the flexible characteristics of the film-former and the required flexibility of the release coated surface. Examples of suitable film-former agents for use in this invention are nitrocellulose, copolymers of vinyl acetate-vinyl chloride and polystyrene. It is preferred that the foregoing film formers be plasticized with a suitable plasticizer such as dioctyl phthalate, n-octyl-n-decyl phthalate, a liquid polyester or the like. Examples of suitable film-former which possess high flexibility and usually require no plasticizer are copolymers of a major proportion of styrene with a minor proportion of a conjugated diene, e.g. butadiene, isoprene and the like, and internally plasticized film-former agents of copolymers of vinyl acetate-acrylate esters such as vinyl acetate-butyl acrylate copolymer. The particular choice of film-former will depend on the substrate being used, choosing to obtain a high bond strength between the film-former and substrate. For instance, polystyrene has high bond strength to a paper saturated with butadiene styrene copolymer, but nitrocellulose would be preferable if the base paper were saturated with a butadiene-acrylonitrile copolymer.

As indicated heretofore, the release agent useful in accordance with this invention is a high melting waxy material having a melting point above about 200° F. and preferably are substantially insoluble in aliphatic and aromatic solvents at normal temperatures. Preferred release agents of this invention are N—N'-bis alkylene amides of fatty acids such as N—N' methylene bis stearamide manufactured by the Glyco Company, Brooklyn, N.Y., and sold under the trade name "Acrawax C" [M.P. 284–290° F.] and also manufactured by Armour Chemical Division, Chicago, Illinois, and sold under the trade name "Armowax" [M.P. 270° F.], N,N' ethylene bis stearamide manufactured by Advance Solvents and Chemical Corp., New York, N.Y., and sold under the trade name "Adva Wax" [M.P. 280° F.] and also manufactured by the Carlisle Chemical Works and sold under the trade name "Carlise Wax 240" [M.P. 240° F.], "Carlise Wax 280" [M.P. 280° F.] and "Carlise Wax 290" [M.P. 290° F.]. Other waxes which may be used, although not as desirable as the above preferred waxes because of their lower resistance to solvents, include hydrocarbon waxes of the Fisher-Tropsch type such as the hydrocarbon wax manufactured by H. L. Barnebey Company and sold under the trade name "Syn Par A" (M.P. 228° F.), and the hydrocarbon waxes manufactured by Strohmeyer & Arpe Company and sold under the trade name "Roxite 10" (M.P. 228–230° F.), "Roxite 11" (M.P. 217–219° F.), "Roxite 12" (M.P. 220–222° F.) and "Roxite 13" (M.P. 213–215° F.).

The proportions of the ingredients in the backsize may vary over a wide range dependent upon the particular film former and release agent used and the desired characteristics of the coat. In general, the film former is in an amount of 99.5–40 parts by weight, the waxy release agent in an amount from 0.5–20 parts by weight and the plasticizer in an amount from 0–40 parts by weight. Where a plasticizer is employed it is preferred that the film-former agent be in an amount from 94–60 parts by weight, the waxy material in an amount from about 1–10 parts by weight and the plasticizer in an amount from 5–30 parts by weight. Where no plasticizer is used, it is preferred that the film former agent be in an amount from 99–90 parts by weight and the waxy release agent in an amount from 1–10 parts by weight.

The novel backsize compositions of this invention may be applied to the substrate in any conventional manner as, for example, by the use of a roll coater, knife coater, spray coater, etc., by the utilization of a suitable solvent. In general, the backsize coatings are applied at a coating weight of about 2.5 oz. per sq. yd. down to a minimum weight per sq. yd., which will give a continuous coating, as, for example, 0.05 ounce/sq. yd. Any solvent or mixture of solvents in which the film former agent is soluble may be used for applying the backsize composition to the substrate. Thus the particular solvent used is chosen on the basis of the particular film-former agent employed. For example, for nitrocellulose and vinyl chloride-vinyl acetate copolymers a straight ketone solvent may be employed, while for polystyrene film former agents aliphatic hydrocarbon solvents, such as octane, and aromatic solvents, such as toluene, may be used.

The backsize coating may be dried in any conventional manner. If desired, it may be dried at room temperature, but generally an elevated temperature, in the range of 180° to 200° F., is used in order to shorten the time of drying. Any conventional drier may be used for this purpose, such as a hot air drier.

As heretofore indicated, the backsize compositions of this invention are particularly useful in providing release coatings for backings conventionally used in normally tacky and pressure-sensitive tapes. Examples of such backings are those formed from kraft pulp and the like, and which may include impregnants for unifying purposes. The sheets may be flat, creped or otherwise treated to increase stretchability. Paper sheets made from rope or rag fibers or other fibrous material may be used, as well as cloth or non-woven fabrics such as those manufactured by the Chicopee Mfg. Corp. and sold under the trademark "Masslinn." Also, the backsize compositions in forming the novel tapes may be applied to non-fibrous films such as cellophane, vinyl films, polyethylene terephthalate, etc.

In forming the novel tapes of this invention, the adhesive may be applied to the backing in any conventional manner, as, for example, by calendering, reverse roll-coater, knife-coater, etc. The adhesive is generally coated at a dry coating weight of about 1 to 3 ounces per sq. yd. The adhesive is preferably applied to the backing from solvent solution or dispersion using aliphatic or aromatic solvents and subsequent drying. If desired, the backing may be provided with a suitable conventional priming coating to improve the adhesion of the coating thereto. Suitable primer coatings are, for example, those disclosed in Bemmels Patent No. 2,647,843. Any suitable normally tacky and pressure-sensitive adhesive useful in making tapes may be used. Such adhesives are generally compounded from a composition including an elastomeric component, which is usually a natural or synthetic rubber or similar elastomeric polymer, and a resinous component compatible with the rubber and adapted to impart tack to the adhesive composition, together with suitable amounts of various types of additives such as conventional fillers, antioxidants, etc. The elastomeric component, tackifying resin, and fillers, when used, are proportioned to obtain in the adhesive properties of high internal strength and cohesiveness and high adhesiveness.

As indicated heretofore the film former agent used for adhering the waxy release agent to the backing will vary depending upon the particular backing employed. For example, for cellulosic backings, a polyvinyl acetate film former may be used. A suitable film former for butadiene-styrene impregnated paper is polystyrene while for a butadiene-acrylonitrile impregnated paper nitrocellulose or a vinyl chloride-vinylidene chloride copolymer may be used as the film former in the backsize coat; and, for vinyl film backings, a vinyl film former is suitable, such as a vinyl chloride-vinyl acetate copolymer.

The following are examples of the preparation of novel backsize compositions, normally tacky and pressure-sensitive tapes and interliners in accordance with the present invention. Unless otherwise indicated, the amounts given are by weight:

*Example I*

A backsize composition A is formed by combining:

Everflex A (Dewey & Almy); internally plasticized polyvinyl acetate latex—85 parts.

Acrawax C (Glyco); (M.P. 284–290° F.); used in form of dispersion S933 (33% solids); nitrogen derivative of higher fatty acids—comprises N,N' methylene bis stearamide—15 parts.

An interliner A is produced by coating backsize composition A at a coating weight of 0.5 ounces/sq. yd. on both sides of a backing comprising a 30 pound crepe saturating paper impregnated with an equal part mixture of a butadiene-acrylonitrile copolymer (30% acrylonitrile—Mooney viscosity 45) and a copolymer of butadiene-styrene (15% butadiene—Mooney viscosity 80).

Interliner A exhibits good release characteristics without detackification when in contact with an adhesive tape comprising a 2-mil rope paper having on each side a 1½ ounce/sq. yd. coat of an adhesive having the following recipe:

| | Parts |
|---|---|
| GR–S (butadiene-styrene copolymers—(71:29)— Mooney viscosity 60) | 19 |
| Crude rubber | 19 |
| Polyterpene resin (M.P. 115° C.) | 30 |
| Fillers | 30 |
| Antioxidant | 2 |

*Example II*

A backsize composition B is formed by combining:

Gelva TS30 (medium low polymer—latex 55% solids—pH 4–6—emulsion viscosity 4.5–6.5 poises); (Shawinigan); straight polyvinyl acetate—80 parts.

Acrawax C (Glyco); 10 parts.

Resoflex R296 (Cambridge Industries); alkyd resin—viscosity Z2; acid No. 32; refractive index 1.471—10 parts.

An interliner B is produced by coating backsize composition B at a coating weight of 1.5 ounces/sq. yd. on both sides of a backing comprising 44 x 40 cotton sheeting greige goods.

Interliner B exhibits good release characteristics without detackification when in contact with an adhesive tape comprising a backing of 68 x 72 greige goods having on each side a 4.0 ounce/sq. yd. coat of an adhesive mass having the following recipe:

| | Percent |
|---|---|
| GR-S | 18 |
| Crude | 18 |
| Filler | 31 |
| Resin | 31 |
| Antioxidant | 2 |

*Example III*

A backsize composition C is produced by combining:

Geon 652 (B. F. Goodrich); latex (pH 6.0, viscosity 9–14 cp. particle size 0.2 microns); internally plasticized vinyl chloride; 85 parts.
Acrawax C (Glyco); 15 parts.

A 30-pound crepe paper [100% impregnated with a latex of equal parts of butadiene-acrylonitrile (30% acrylonitrile—45 Mooney viscosity) and butadiene-styrene copolymer (50% styrene—Mooney viscosity 60)] backing is coated on one side with backsize composition C at a coating weight of 0.2 ounce per square yard and on the other side, at a coating weight of 2 ounces/sq. yd., with an adhesive having the following recipe:

| | Parts |
|---|---|
| GR-S | 26 |
| Crude | 13 |
| Filler | 35 |
| Resin | 25 |
| Antioxidant | 1 |

*Example IV*

A backsize composition D is produced by combining:

Vinylite VYHH (Bakelite); 87% vinyl chloride, 13% vinyl acetate; sp. gr. 1.36; intrinsic viscosity 0.53; 58 parts.
Acrawax C; 0.75 parts.
Plasticizer; Paraplex G–25 (Rohm & Haas); polyester; molecular weight 8000; viscosity 1700 poises; refractive index 1.470; Sap'n. No. 460; 20 parts.
Tricresyl $PO_4$; 5 parts.
Pigments and stabilizers; 16.25 parts.

A tape is produced by coating one side of 56 x 48 cloth with backsize composition D at a coating weight of 2.0 ounces per sq. yard and the opposite side at a coating weight of 4.5 ounces/sq. yd. with an adhesive mass having the following recipe:

| | Parts |
|---|---|
| GR-S | 16 |
| Crude | 7 |
| Reclaim | 22 |
| Softener | 2 |
| Filler | 24 |
| Resin | 28 |
| Antioxidant | 1 |

*Example V*

A backsize composition E is produced by combining:

Lustrex 620 (Monsanto); plasticized polystyrene latex (40% solids, pH 8–9) containing 33% butyl benzyl phthalate; 90 parts.
Acrawax C (Glyco); 10 parts.

A tape is formed by coating one side of a 30 pound impregnated paper of the type described in Example III with backsize composition E at a coating weight of 0.2 ounces/sq. yd. and the opposite side at a coating weight of 2.5 ounces/sq. yd. with an adhesive mass having the following recipe:

| | Parts |
|---|---|
| Pale crepe | 42 |
| Filler | 19 |
| Resin | 34 |
| Antioxidant | 2 |
| Softener | 3 |

*Example VI*

A backsize composition F is produced by combining:

Nitrocellulose (5/6 Second N/C); 72 parts.
Acrawax C; 2 parts.
Dioctyl phthalate; 20 parts.
Tricresyl phosphate; 6 parts.

A tape is produced by coating one side of a 30 pound impregnated paper of the type described in Example III with backsize composition F at a coating weight of 0.2 ounce/sq. yd. and the opposite side with the adhesive mass of Example II at a coating weight of 2. ounces/sq. yd.

*Example VII*

A backsize composition G is produced by combining:

Gelva latex TS30 (see Example II); 80 parts.
Acrawax C (see Example I); 12 parts.
Resoflex R296 (see Example II); 8 parts.

An interliner G is produced by coating both sides of a backing of 44 x 40 cotton sheeting greige goods with backsize composition G at a coating weight of 1.25 ounces/sq. yd. on each side.

Interliner G exhibits good release characteristics when in contact with a double faced tape of the type disclosed in Example II.

*Example VIII*

A release composition is prepared in the same manner as in Example VII except N,N' ethylene bis stearamide ("Carlise 280") is used in place of N,N' methylene bis stearamide (Acrawax C).

Reference is made to Fig. 1 of the drawing illustrating a roll of pressure-sensitive tape wound directly upon itself. The tape comprises a backing having on its back surface a coating of the release composition used in accordance with the present invention and on its front surface a coating of a normally tacky and pressure-sensitive adhesive.

In Fig. 2 is shown a tape roll formed of an adhesive tape coated on both sides with a normally tacky and pressure-sensitive adhesive, and interwound with said tape a removable paper liner coated on both sides with the release composition used in accordance with the present invention.

As will be evident to those skilled in the art, the backsize compositions of the present invention, in addition to providing release coats for normally tacky and pressure-sensitive tapes and interliners for double face tapes, may be also useful in the production of protective sheets to be applied to the tacky surface of pressure-sensitive labels or any article which has a tacky surface, to protect the tacky surface until ready for use. Also, the novel backsize compositions of this invention may be used as casting solutions for casting films possessing good release characteristics due to the presence of the release agent in the cast film.

The invention in its broader aspects is not limited to the specific compositions, steps, combinations and improvements described, but departures may be made therefrom within the scope of the accompanying claims without departing from the principles of the invention and without sacrificing its chief advantages.

What is claimed is:

1. A normally tacky and pressure-sensitive adhesive tape comprising a backing, a coat of a normally tacky and pressure-sensitive adhesive on one side of said backing and a coat of a release coating composition on the opposite side of said backing, said release coating composition comprising a film-former agent having the characteristics of toughness, flexibility and good adhesion to the backing and a monomeric waxy release agent having a melting point above 200° F. selected from the group consisting of N,N'-bis alkylene amides of fatty acids and hydrocarbon waxes.

2. A normally tacky and pressure-sensitive adhesive tape according to claim 1 wherein the release agent is an N,N'-bis alkylene amide of a fatty acid.

3. A normally tacky and pressure-sensitive adhesive tape in accordance with claim 1 wherein the release agent is N,N'-methylene bis stearamide.

4. A normally tacky and pressure-sensitive adhesive tape in accordance with claim 1 wherein the release agent is N,N'-ethylene bis stearamide.

5. The method of improving the release characteristics of the back side of a normally tacky and pressure-sensitive adhesive tape comprising a backing having a normally tacky and pressure-sensitive adhesive coated on its front side, said method comprising applying to the back side of said backing a release coating composition comprising a film-former agent having the characteristics of toughness, flexibility and good adhesion to the surface to which said release coating composition is to be applied and a monomeric waxy release agent having a melting point above 200° F. selected from the group consisting of N,N'-bis alkylene amides of fatty acids and hydrocarbon waxes.

6. The method of improving the release characteristics of the back side of a normally tacky and pressure-sensitive adhesive tape according to claim 5 wherein the release agent is an N,N'-bis alkylene amide of a fatty acid.

7. The method of improving the release characteristics of the back side of a normally tacky and pressure-sensitive adhesive tape according to claim 5 wherein the release agent is N,N'-methylene bis stearamide.

8. The method of improving the release characteristics of the back side of a normally tacky and pressure-sensitive adhesive tape according to claim 5 wherein the release agent is N,N'-ethylene bis stearamide.

9. A roll of double-coated normally tacky and pressure-sensitive adhesive tape having interwound therewith a liner of paper coated on both sides with a release coating composition comprising a film-former agent having the characteristics of toughness, flexibility and good adhesion to backing and a monomeric waxy release agent having a melting point above 200° F. selected from the group consisting of N,N'-bis alkylene amides of fatty acids and hydrocarbon waxes.

10. A roll of double-coated normally tacky and pressure-sensitive adhesive tape according to claim 9 wherein the release agent is an N,N'-bis alkylene amide of a fatty acid.

11. A roll of double-coated normally tacky and pressure-sensitive adhesive tape according to claim 9 wherein the release agent is N,N'-methylene bis stearamide.

12. A roll of double-coated normally tacky and pressure-sensitive adhesive tape according to claim 9 wherein the release agent is N,N'-ethylene bis stearamide.

References Cited in the file of this patent

UNITED STATES PATENTS

| | | |
|---|---|---|
| 2,469,108 | Fries | May 3, 1949 |
| 2,484,416 | Martin | Oct. 9, 1949 |
| 2,532,011 | Dahlquist | Nov. 28, 1950 |
| 2,594,547 | Fischer | Apr. 29, 1952 |
| 2,653,880 | Hendricks | Sept. 29, 1953 |
| 2,659,713 | Magat | Nov. 17, 1953 |
| 2,695,303 | Buckmann | Nov. 23, 1954 |
| 2,776,913 | Anderson | Jan. 8, 1957 |